United States Patent
Kurematsu et al.

(10) Patent No.: US 9,702,441 B2
(45) Date of Patent: *Jul. 11, 2017

(54) CHAIN TENSIONER

(71) Applicant: TSUBAKIMOTO CHAIN CO., Osaka-shi, Osaka (JP)

(72) Inventors: Yuji Kurematsu, Osaka (JP); Osamu Yoshida, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 162 days.

This patent is subject to a terminal disclaimer.

(21) Appl. No.: 14/643,091

(22) Filed: Mar. 10, 2015

(65) Prior Publication Data

US 2015/0267789 A1    Sep. 24, 2015

(30) Foreign Application Priority Data

Mar. 24, 2014   (JP) .................................. 2014-060440

(51) Int. Cl.
*F16H 7/08*      (2006.01)

(52) U.S. Cl.
CPC ............ *F16H 7/08* (2013.01); *F16H 7/0836* (2013.01); *F16H 2007/0806* (2013.01); *F16H 2007/0812* (2013.01); *F16H 2007/0859* (2013.01); *F16H 2007/0893* (2013.01)

(58) Field of Classification Search
CPC .. F16H 7/08; F16H 7/0836; F16H 2007/0806; F16H 2007/0812; F16H 2007/0859; F16H 2007/0893
USPC ........................................................ 474/110
See application file for complete search history.

(56) References Cited

U.S. PATENT DOCUMENTS

| | | | | |
|---|---|---|---|---|
| 4,997,411 A * | 3/1991 | Breon | ....................... | F16F 1/08 474/110 |
| 5,879,256 A * | 3/1999 | Tada | ........................ | F16H 7/08 474/110 |
| 5,908,363 A * | 6/1999 | Suzuki | .................. | F16H 7/0848 474/101 |
| 6,602,154 B1 * | 8/2003 | Guichard | .................. | F16H 7/08 474/101 |

(Continued)

FOREIGN PATENT DOCUMENTS

| CN | 103711848 A | 4/2014 |
|---|---|---|
| CN | 103925348 A | 7/2014 |

(Continued)

*Primary Examiner* — William E Dondero
*Assistant Examiner* — Robert T Reese
(74) *Attorney, Agent, or Firm* — Westerman, Hattori, Daniels & Adrian, LLP

(57) ABSTRACT

Provided is a chain tensioner that can improve the degree of freedom in setting the oil supply position with a simple structure, can supply sufficient and necessary oil when restarted after a long time after the stop of oil supply, can entirely be made shorter and smaller, and can be produced easily with reduced cost. In a chain tensioner 100 in which a plunger 120 inserted in a plunger bore 111 of a tensioner body 110 is biased outward by biasing means 140 provided in an oil pressure chamber 101 to be extendable and contractible, an oil reservoir chamber 123 is formed on an outer side than a check valve 150 inside a plunger body 126, and a connection/adjustment groove 103 forming an oil supply space 102 is formed in an inner circumferential surface of the plunger bore 111.

5 Claims, 12 Drawing Sheets

(56) References Cited

U.S. PATENT DOCUMENTS

| | | | |
|---|---|---|---|
| 7,918,754 B2* | 4/2011 | Kurematsu | ........... F16H 7/0848 |
| | | | 474/110 |
| 2008/0318717 A1 | 12/2008 | Kurematsu | |
| 2013/0331212 A1* | 12/2013 | Kurematsu | ............... F16H 7/08 |
| | | | 474/110 |
| 2014/0100068 A1 | 4/2014 | Kurematsu | |
| 2014/0200104 A1* | 7/2014 | Kurematsu | ............... F16H 7/08 |
| | | | 474/110 |

FOREIGN PATENT DOCUMENTS

| | | | |
|---|---|---|---|
| GB | 2 308 480 A | 6/1997 | |
| JP | 9-177907 A | 7/1997 | |
| JP | 2002-005251 A | 1/2002 | |
| JP | 3585683 B2 | 8/2004 | |
| JP | 3929680 B2 | 6/2007 | |
| JP | 2009-2495 A | 1/2009 | |
| JP | 4376278 B2 | 12/2009 | |

* cited by examiner

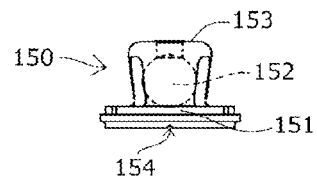
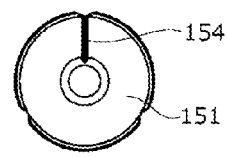
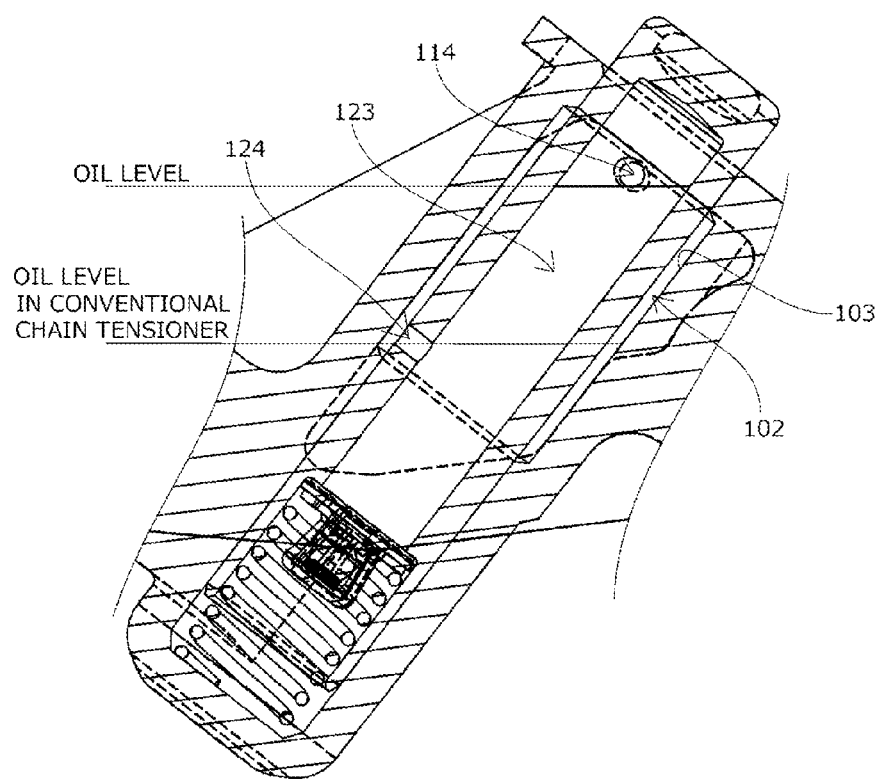

Related Art

Related Art

CHAIN TENSIONER

BACKGROUND OF THE INVENTION

1. Field of the Invention

The present invention relates to a chain tensioner including a tensioner body having a cylindrical plunger bore with an open end, a cylindrical plunger slidably inserted in the plunger bore, and biasing means accommodated inside an oil pressure chamber formed between the plunger bore and the rear end of the plunger such as to be able to expand and contract and to bias the plunger outward, the chain tensioner being capable of maintaining appropriate tension of a chain.

2. Description of the Related Art

It has been common practice to use a chain tensioner for maintaining appropriate tension in the chain. For example, in a chain guide mechanism that slidably guides a transmission chain such as an endless roller chain passing over respective sprockets of a crankshaft and a cam shaft inside an engine room, by means of a guide shoe, it is known to press a pivoting chain guide having the guide shoe by a chain tensioner to maintain appropriate tension.

For example, as shown in FIG. 13, an endless timing chain CH passes over a drive sprocket S1 attached to a crankshaft and a pair of driven sprockets S2 and S3 attached to cam shafts in an engine room. A chain guide mechanism has a pivoting chain guide G1 and a stationary chain guide G2 for guiding this timing chain CH.

The stationary chain guide G2 is fixed in position in the engine room with two mounting shafts B1 and B2, while the pivoting chain guide G1 is attached such as to be pivotable around the mounting shaft B0 in the plane in which the timing chain CH runs in the engine room.

The chain tensioner 500 maintains the tension of the timing chain CH at an appropriate level as well as reduces its vibration by pressing the pivoting chain guide G1 against the chain.

The known chain tensioner 500 used in such a chain guide mechanism includes, for example, as shown schematically in FIG. 14, a tensioner body 510 having a cylindrical plunger bore 511 with an open end, a cylindrical plunger 520 in the plunger bore 511 to slide against the cylindrical surface 513 of the plunger bore 511, and biasing means that biases the plunger 520 outward from the plunger bore 511.

The biasing means is a coil spring 540 accommodated inside a cylindrical recess 521 in the cylindrical plunger 520 and compressed between the plunger and the bottom 512 of the plunger bore 511.

Oil is supplied from an oil supply hole 514 formed in the plunger bore 511, so that an oil pressure chamber 501 formed between the plunger bore 511 and the plunger 520 is filled with oil, which oil biases the plunger 520 outward. A check valve 550 (schematically shown as a check ball) stops the oil from flowing out from the oil supply hole 514.

As the plunger 520 reciprocates, oil flows through the small gap between the plunger 520 and the plunger bore 511, and the flow resistance provides the damping effect of slowing down the reciprocal movement of the plunger 520.

In such a known chain tensioner 500, when let stand for a long time after the oil supply is stopped (in the case with an engine, after the engine is stopped), there is a time lag before oil is supplied immediately after the next start-up. As no oil is replenished but the oil in the oil pressure chamber 501 leaks out when the plunger 520 moves back and forth, there occurs a shortage of oil in the oil pressure chamber 501. Because of this shortage of oil, the damping force of the oil does not act on the plunger 520, which sometimes lead to vibration and abnormal noise of the timing chain CH, or may damage the timing chain CH.

Therefore, it is also known to design the tensioner to have an oil reservoir chamber inside the plunger to supply oil into the oil pressure chamber. A constant amount of oil is thereby retained in the oil reservoir chamber, so that, even immediately after the start-up after a long stop, oil remaining in the oil reservoir chamber is supplied to the oil pressure chamber, to maintain the damping force of oil on the plunger and to prevent vibration or damage of the chain (see Japanese Patent Application Laid-open No. H9-177907 and Japanese Patent No. 4376278).

SUMMARY OF THE INVENTION

With the technique described in Japanese Patent Application Laid-open No. H9-177907, however, most of the oil supplied from the oil reservoir chamber (oil reserve chamber 9) into the oil pressure chamber (high pressure chamber 14) leaks out of the oil pressure chamber through the gap between the plunger and the plunger bore (plunger chamber 4) as the plunger reciprocates immediately after the start-up, as well as leaks out from the oil supply hole (supply hole 12) or from the distal end of the plunger, so that the amount of oil in the oil reservoir chamber (oil reserve chamber 9) is reduced gradually.

It is therefore necessary to retain enough oil in the oil reservoir chamber (oil reserve chamber 9) during the time lag before oil is supplied from the oil supply hole (supply hole 12) immediately after the start-up. However, the oil level cannot be maintained higher than the oil supply hole (supply hole 12).

Accordingly, the oil reservoir chamber (oil reserve chamber 9) needs to have a large capacity inside, because of which the entire tensioner cannot be made shorter and can hardly be made smaller.

With the technique described in Japanese Patent No. 4376278, the oil supply hole (oil supply hole 122) is arranged in an upper part and oriented diagonally forward so that oil that has leaked from the oil pressure chamber (high pressure oil chamber R) through the gap between the plunger and the plunger bore is at least prevented from leaking through the oil supply hole (oil supply hole 122) to the outside.

However, this configuration poses restrictions on the position of the oil supply hole (oil supply hole 122) because it cannot be applied to a design in which oil is supplied other than from above.

With the known techniques described in Japanese Patent Application Laid-open No. H9-177907 and in Japanese Patent No. 4376278, an oil supply space is formed by processing the outer circumferential surface of the plunger. Therefore, if the plunger is designed to protrude upward relative to the horizontal plane, the supply space has to be formed on the lower side, so that the oil supply hole in the plunger bore also has to be located in a lower position.

Moreover, the plunger has many parts that need to be processed, which makes the production process complex, poses limitations on material and the like, and increases cost.

The present invention is directed to solve these problems, and aims to provide a chain tensioner that can improve the degree of freedom in setting the oil supply position with a simple structure, can supply sufficient and necessary oil when restarted after a long time after the stop of oil supply, can entirely be made shorter and smaller, and can be produced easily with reduced cost.

The chain tensioner according to the present invention solves the problems described above by including: a tensioner body having a cylindrical plunger bore with an open end; a cylindrical plunger slidably inserted in the plunger bore, the plunger including a plunger body and a check valve provided inside the plunger body; and biasing means accommodated inside an oil pressure chamber formed between the plunger bore and a rear end of the plunger such as to be able to expand and contract and to bias the plunger outward, wherein an oil reservoir chamber is formed on an outer side than the check valve inside the plunger body, a connection/adjustment groove forming an oil supply space is formed in an inner circumferential surface of the plunger bore, an oil supply hole for supplying oil to the supply space is formed in the plunger bore, and a plunger hole for supplying oil from the supply space to the oil reservoir chamber is formed in the plunger body.

In the chain tensioner as set forth in claim 1, the connection/adjustment groove that forms the oil supply space is formed in the inner circumferential surface of the plunger bore. Therefore, if the plunger is designed to protrude upward relative to the horizontal plane, the oil supply space will be located higher than the plunger hole wherever the plunger is located.

The degree of freedom in design, for setting the position of the oil supply hole higher than the plunger hole, is significantly improved, whereby the amount of remaining oil can be readily increased without enlarging the oil reservoir chamber.

Also, since the plunger does not need to be processed to provide a hole in the outer circumferential surface thereof, the production process is simplified, and there will be less limitations on material and the like.

This way, sufficient and necessary oil can be supplied when restarted after a long time after the stop of oil supply, the production is made easy and the production cost is reduced, and the tensioner can entirely be made shorter and smaller.

According to the configuration as set forth in claim 2, the oil supply hole is located in close vicinity to an outward end of the supply space, so that, if the plunger is designed to protrude upward relative to the horizontal plane, the amount of remaining oil can be made even larger.

According to the configuration as set forth in claim 3, an inner leak groove extending from the oil pressure chamber to the oil reservoir chamber is formed in the check valve, so that, when the plunger reciprocates, oil is supplied from the oil reservoir chamber to the oil pressure chamber via the check valve, and the oil in the oil pressure chamber is directly recovered into the oil reservoir chamber through the inner leak groove.

Therefore, the amount of oil leaking to the outside from the distal end of the plunger through the gap between the plunger and the plunger bore is reduced irrespective of the position of the oil supply hole or the mounting orientation of the chain tensioner itself, so that much more oil can be recovered into the oil reservoir chamber from the plunger hole that opens to the supply space.

Therefore, a sufficient and necessary amount of oil can be secured for the next start-up by reducing the amount of oil leaking outside immediately after the stop of oil supply and by circulating and recovering the oil from the oil pressure chamber into the oil reservoir chamber, which enables the oil reservoir chamber to have a smaller space, and the entire tensioner to be shorter and smaller.

With the structure as set forth in claim 4, an outer leak groove extending from the oil pressure chamber to the supply space is formed in an outer circumferential surface of the plunger body on the oil pressure chamber side, so that, when the plunger reciprocates immediately after the start-up after being stopped for a long time, oil is supplied from the oil reservoir chamber to the oil pressure chamber via the check valve, wherein most of the oil in the oil pressure chamber passes through the outer leak groove, and is recovered into the oil reservoir chamber through the supply space, plunger hole, internal supply cavity, and oil passing groove.

Therefore, the amount of oil leaking to the outside from the distal end of the plunger through the gap between the plunger and the plunger bore is further reduced, so that much more oil can be recovered into the oil reservoir chamber.

With the structure as set forth in claim 5, the outer leak groove is located in a circumferentially same phase position as the plunger hole, so that more of the oil leaking through the outer leak groove into the supply space flows directly toward the plunger hole with the reciprocation of the plunger, and more oil is recovered into the oil reservoir chamber through the plunger hole, internal supply cavity, and oil passing groove instead of leaking to the outside.

BRIEF DESCRIPTION OF THE DRAWINGS

FIG. 7A and FIG. 7B are a side view and a rear view of a check valve;

FIG. 8 is an explanatory diagram of the chain tensioner with oil remaining inside according to the first embodiment of the present invention;

DESCRIPTION OF THE PREFERRED EMBODIMENTS

Figure 1:
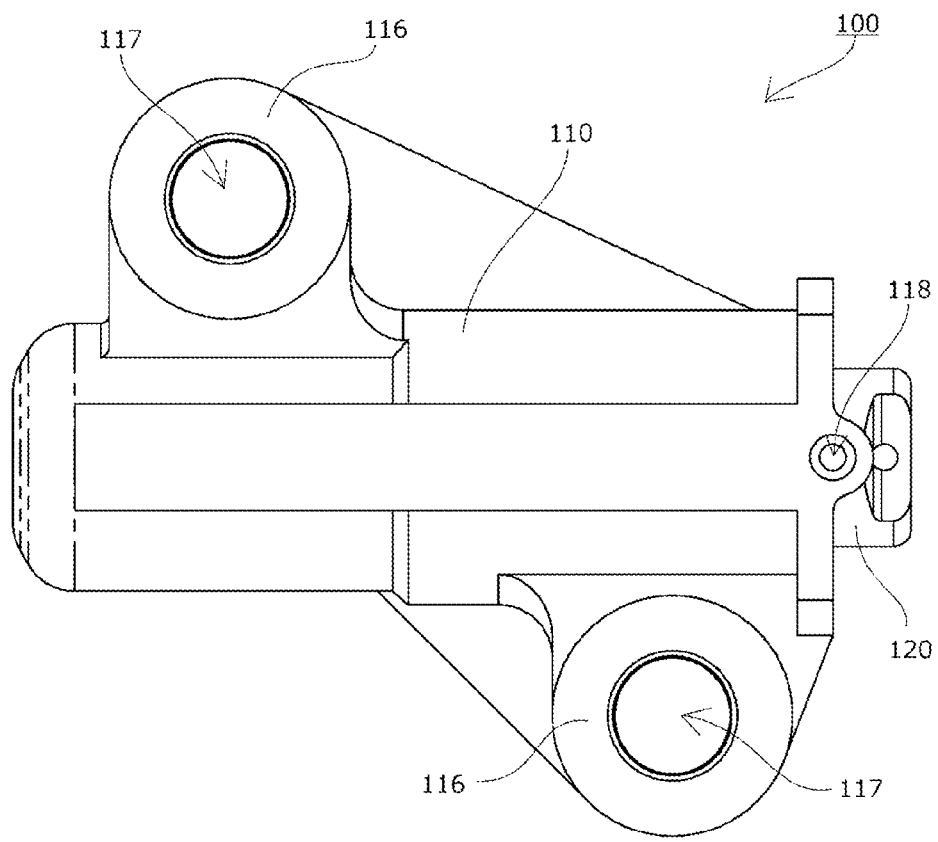
FIG. 1 is a plan view of the chain tensioner according to a first embodiment of the present invention.
Figure 2:
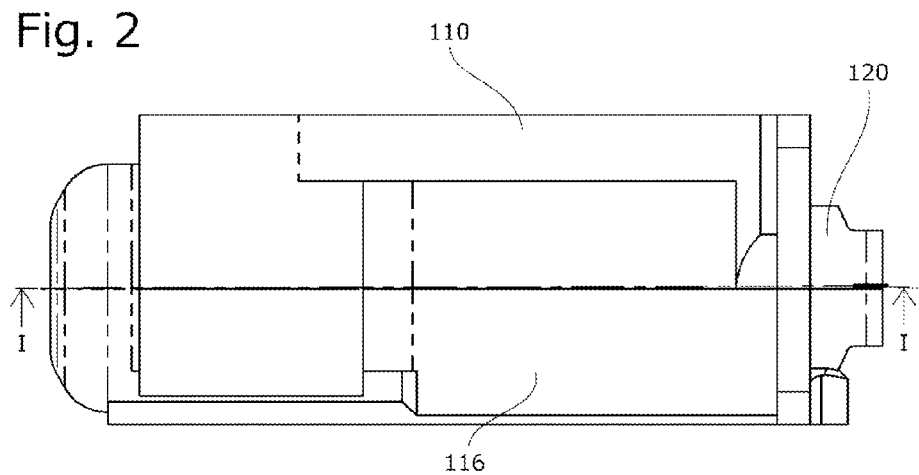
FIG. 2 is a side view of the chain tensioner according to the first embodiment of the present invention.
Figure 3:
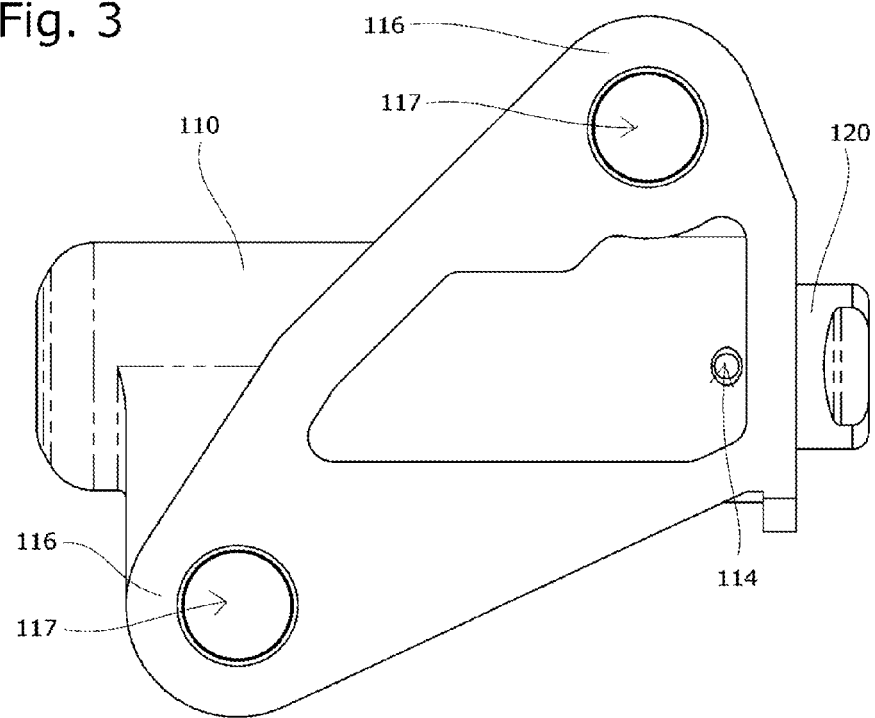
FIG. 3 is a bottom view of the chain tensioner according to the first embodiment of the present invention.

The chain tensioner of the present invention may be embodied in any specific form as long as it includes: a tensioner body having a cylindrical plunger bore with an open end; a cylindrical plunger slidably inserted in the plunger bore, the plunger including a plunger body and a check valve provided inside the plunger body; and biasing means accommodated inside an oil pressure chamber formed between the plunger bore and a rear end of the plunger such as to be able to expand and contract and to bias the plunger outward, wherein an oil reservoir chamber is formed on an outer side than the check valve inside the plunger body, a connection/adjustment groove forming an oil supply space is formed in an inner circumferential surface of the plunger bore, an oil supply hole for supplying oil to the supply space is formed in the plunger bore, and a plunger hole for supplying oil from the supply space to the oil reservoir chamber is formed in the plunger body, whereby the chain tensioner can improve the degree of freedom in setting the oil supply position with a simple structure, can supply sufficient and necessary oil when restarted after a long time after the stop of oil supply, can entirely be made shorter and smaller, and can be produced easily with reduced cost.

Since the shape of the plunger body is simplified, the plunger may be made by press-forming or the like from a metal sheet blank.

Embodiment 1

A chain tensioner 100 according to a first embodiment of the present invention will be described with reference to the drawings.

The chain tensioner 100 according to the first embodiment of the present invention includes, as shown in FIG. 1 to FIG. 4, a tensioner body 110 having a cylindrical plunger bore 111 with an open end, a cylindrical plunger 120 slidably inserted in the plunger bore 111, and a coil spring 140 that is biasing means accommodated inside an oil pressure chamber 101 formed between the plunger bore 111 and the rear end of the plunger 120 such as to be able to expand and contract and to bias the plunger 120 outward.

The chain tensioner 100 according to this embodiment is securely mounted inside an engine having a chain guide mechanism. For this purpose, the tensioner body 110 has mounting parts 116 with mounting holes 117 for bolts or the like to pass through, as shown in FIG. 1 to FIG. 6.

A connection/adjustment groove 103 is formed in the inner circumference of the plunger bore 111 of the tensioner body 110, to form a supply space 102 between itself and the outer circumferential surface of the plunger body 126. An oil supply hole 114 is formed in the connection/adjustment groove 103 close to the outward end, to which oil is supplied from outside.

Near the opening of the plunger bore 111 is formed a pin hole 118 that radially extends through, so that, with a retainer pin (not shown) inserted in the pin hole 118, the plunger 120 can be fixed in its retracted position, to enable mounting of the tensioner including the plunger 120 assembled therein in the engine or any other such work.

The plunger 120 includes a plunger body 126, and a check valve 150 provided inside the plunger body 126.

The check valve 150 is located inside the plunger body 126, and an oil reservoir chamber 123 is formed on an outer side than the check valve 150.

The check valve 150 includes a ball seat 151, a check ball 152 that can make sealing contact with the oil passage in the ball seat 151, and a retainer 153 that guides the check ball 152.

The biasing means accommodated inside the oil pressure chamber 101 such as to be able to expand and contract and to bias the plunger 120 outward is configured to be seated at one end on the bottom of the plunger bore 111 and at the other end on the outer periphery of the retainer 153 of the check valve 150, so as to efficiently use the depth of the inside of the plunger body 126 as the space for the coil spring 140 to expand and contract.

The tensioner body 110 is fixedly attached to a mounting wall portion (not shown) inside the engine when used, and the oil supply hole 114 is oriented toward the mounting wall portion.

The connection/adjustment groove 103 of the plunger bore 111 extends all around the inner surface so that the supply space 102 formed between the groove and the outer circumferential surface of the plunger body 126 is tubular.

A seat leak groove 154 is formed in the ball seat 151 of the check valve 150, which is an inner leak groove, so that a certain amount of oil can move between the oil pressure chamber 101 and the oil reservoir chamber 123.

How the chain tensioner 100 according to the first embodiment of the present invention configured as described above operates will be explained.

During normal operation, oil is constantly supplied from oil supply means provided in the mounting wall portion (not shown) through the oil supply hole 114 so that the supply space 102 is always filled with oil.

The oil in the supply space 102 is fed into the oil reservoir chamber 123 through the plunger hole 124, so that the oil reservoir chamber 123 is also always filled with oil.

The check valve 150 allows the oil to flow in the direction from the oil reservoir chamber 123 into the oil pressure chamber 101. The oil in the oil reservoir chamber 123 is therefore supplied into the oil pressure chamber 101 through the check valve 150, so that the oil pressure chamber 101 is also always filled with oil.

Thus, the plunger 120 is biased outward by the pressure of oil being supplied from the oil supply means provided in the mounting wall portion (not shown), in addition to the force from the coil spring 140.

When the plunger 120 is pushed inward, the check valve 150 closes, so that oil flows from the oil pressure chamber 101 into the supply space 102 through the gap between the plunger 120 and the plunger bore 111. The flow resistance at this time provides a dampening effect whereby the movement of the plunger 120 is dampened.

Next, how the tensioner operates immediately after the start-up after being left a long time after the stop of oil supply (in the case with an engine, after the engine was stopped) will be described.

Since there is a time lag before oil is supplied immediately after the start-up, no oil is supplied to the supply space 102 through the oil supply hole 114 for a while, so that the tensioner has to operate only with the oil remaining in the oil pressure chamber 101 and the oil reservoir chamber 123.

When the plunger 120 is pushed inward, oil inside the oil pressure chamber 101 flows into the supply space 102 through the gap between the plunger body 126 and the plunger bore 111, as well as directly flows into the oil reservoir chamber 123 via the seat leak groove 154.

On the other hand, the flow resistance is much higher in the gap between the plunger body 126 and the plunger bore 111 closer to the distal end than the supply space 102, so that most of the oil in the supply space 102 does not leak out from the distal end but is recovered through the plunger hole 124 in the oil reservoir chamber 123.

The amount of oil leaking to the outside is thus reduced, so that a sufficient and necessary amount of oil can be secured during the time lag before oil is supplied at the restart.

Furthermore, oil that leaks out of the oil pressure chamber 101 into the supply space 102 flows out from the oil supply hole 114 toward the oil supply means.

If the plunger 120 is designed to protrude upward relative to the horizontal plane as shown in FIG. 8, and if the supply space is provided by forming a groove in the plunger as was conventional, it would be difficult to provide an oil supply hole higher than the plunger hole, so that the level of remaining oil would be located at the height of the plunger hole.

As opposed to this, in the present invention, the connection/adjustment groove 103 that forms the supply space 102 is formed in the inner circumference of the plunger bore 111, so that the oil supply hole 114 is located higher than the plunger hole 124, and the oil level can be maintained as high as at the lower end of this oil supply hole 114. Thus a sufficient amount of oil can be made to remain in the oil reservoir chamber 123.

Moreover, some oil directly flows into the oil reservoir chamber 123 through the seat leak groove 154, so that during the time lag immediately after start-up when the plunger 120 reciprocates until oil starts to be delivered from the oil supply hole 114, oil is directly recovered from the oil pressure chamber 101 into the oil reservoir chamber 123 through the seat leak groove 154.

Accordingly, oil loss in the oil reservoir chamber 123 immediately after start-up is reduced, so that the chain tensioner can operate smoothly immediately after start-up after being left for a long time.

Figure 4:
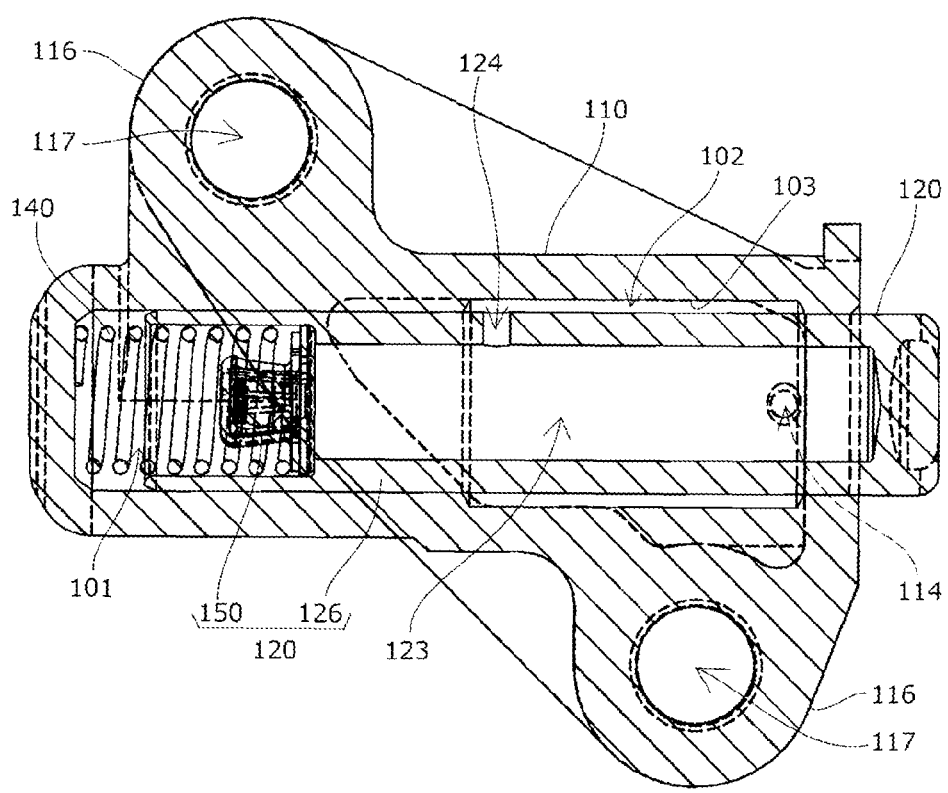
FIG. 4 is a cross-sectional view along I-I of FIG. 2.
Figure 4A:
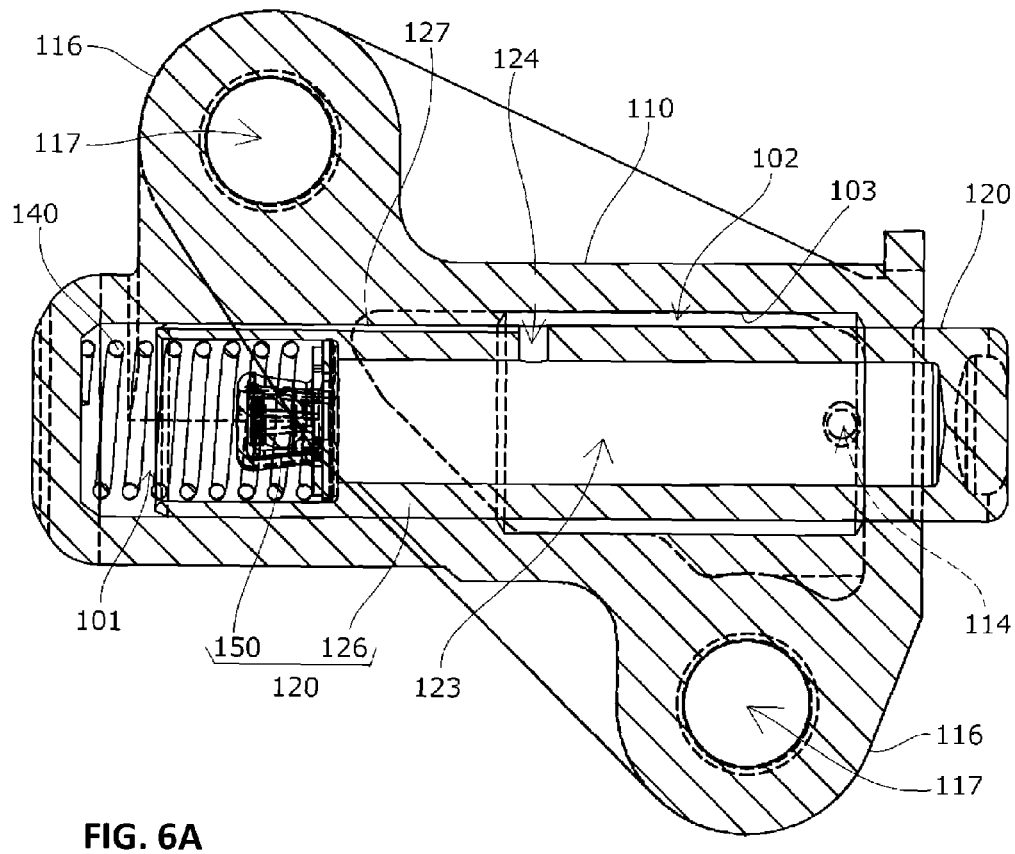
Figure 6A:
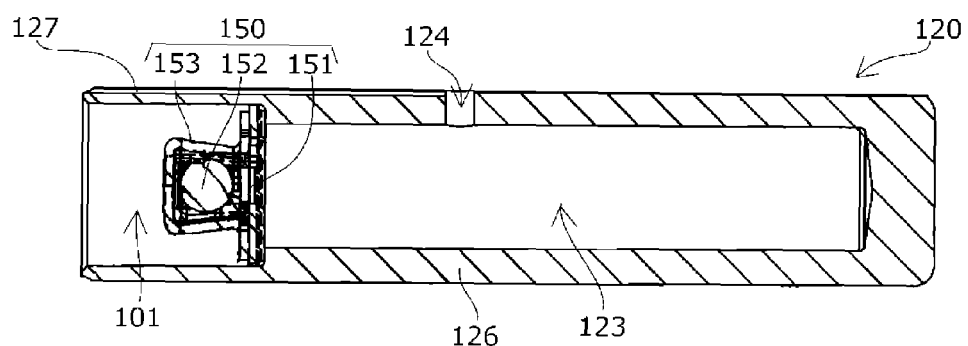
FIG. 6 is a cross-sectional view of the plunger alone.
Figure 5:
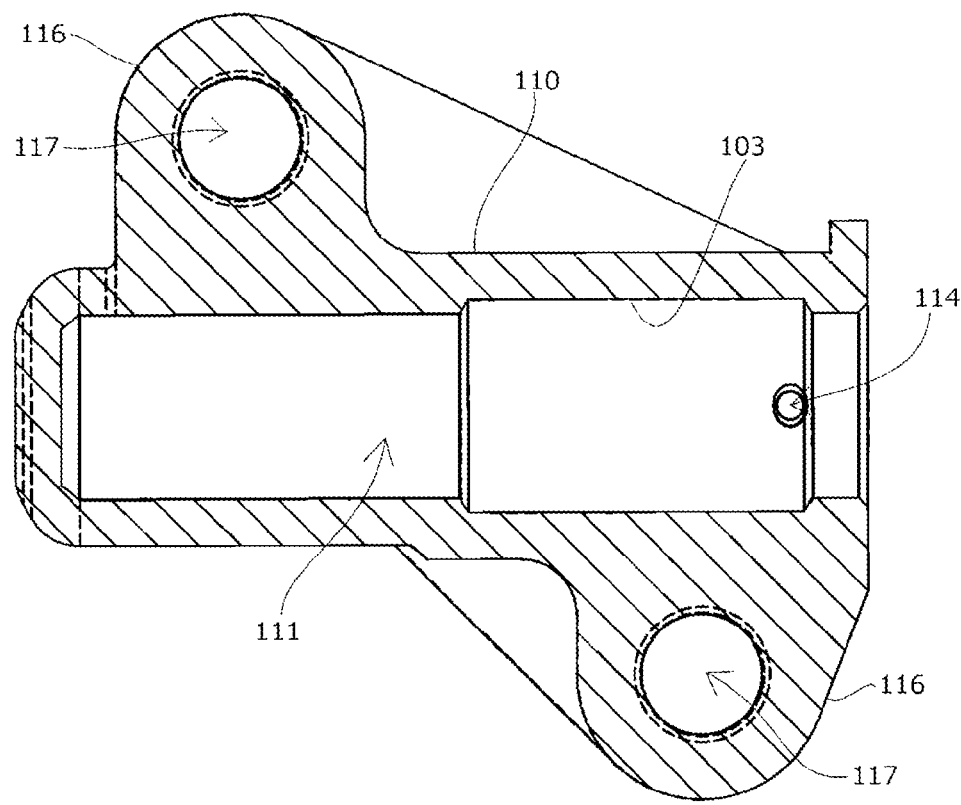
FIG. 5 is a cross-sectional view of the tensioner body alone.
Figure 6:
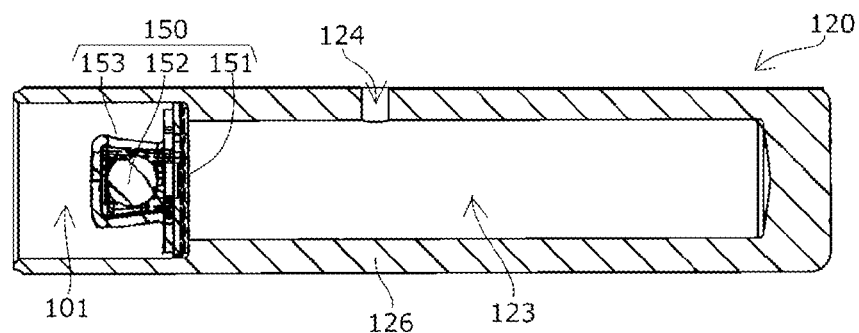
Figure 9:
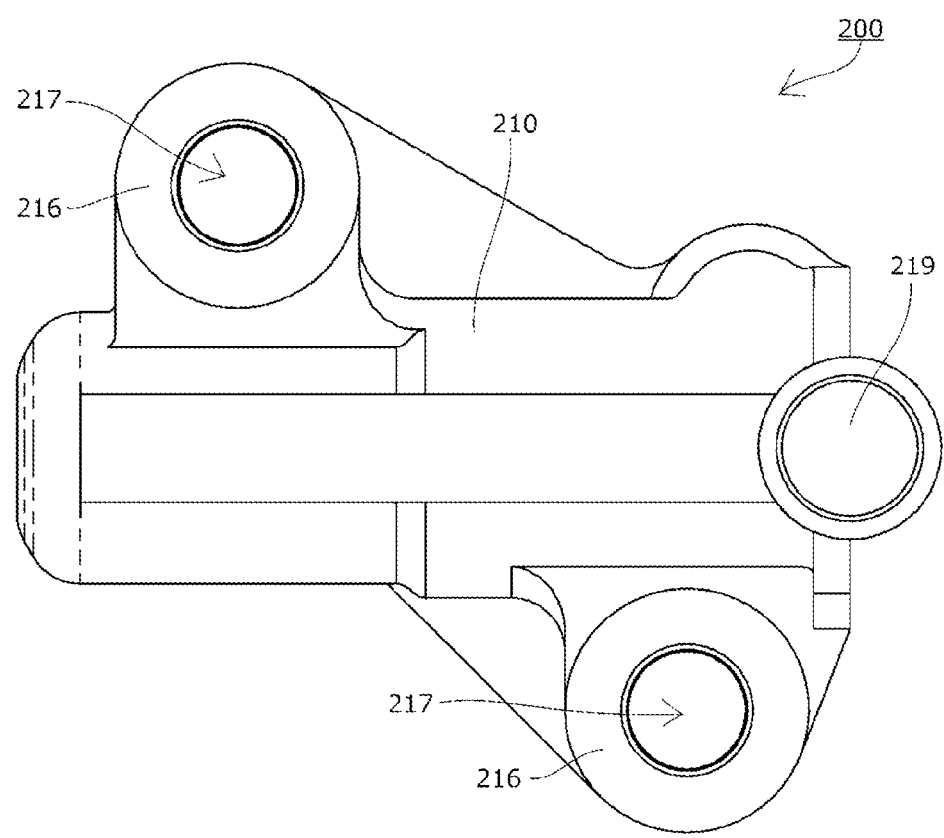
FIG. 9 is a plan view of the chain tensioner according to a second embodiment of the present invention.
Figure 10:
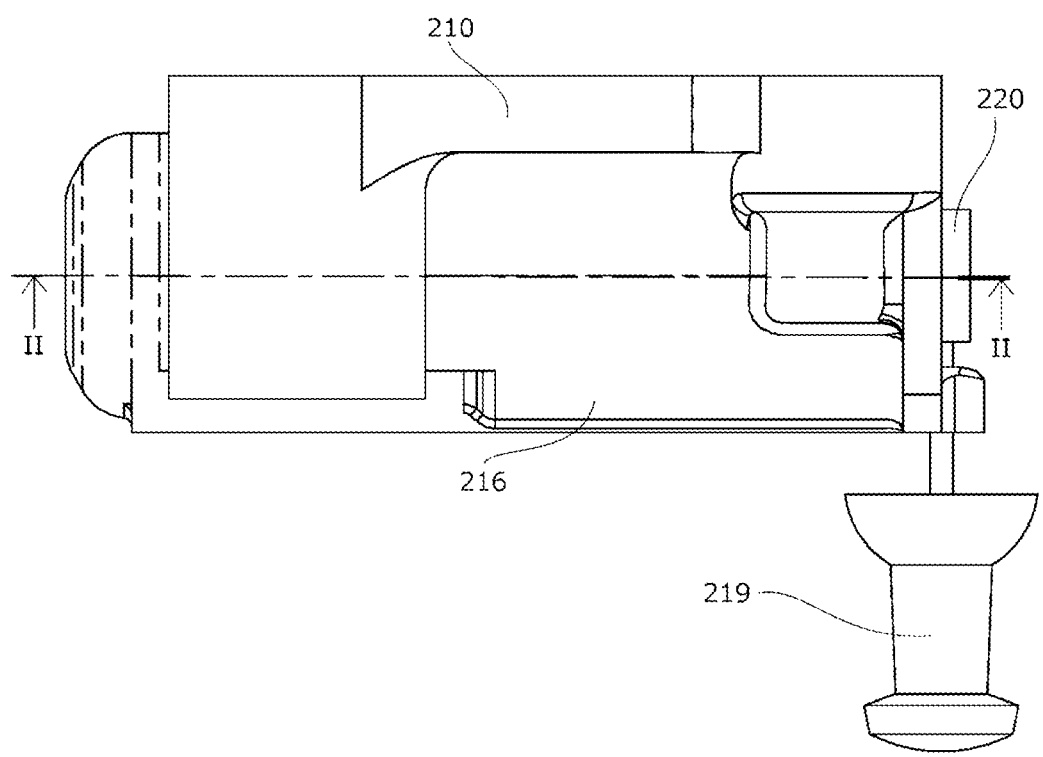
FIG. 10 is a side view of the chain tensioner according to the second embodiment of the present invention.
Figure 11:
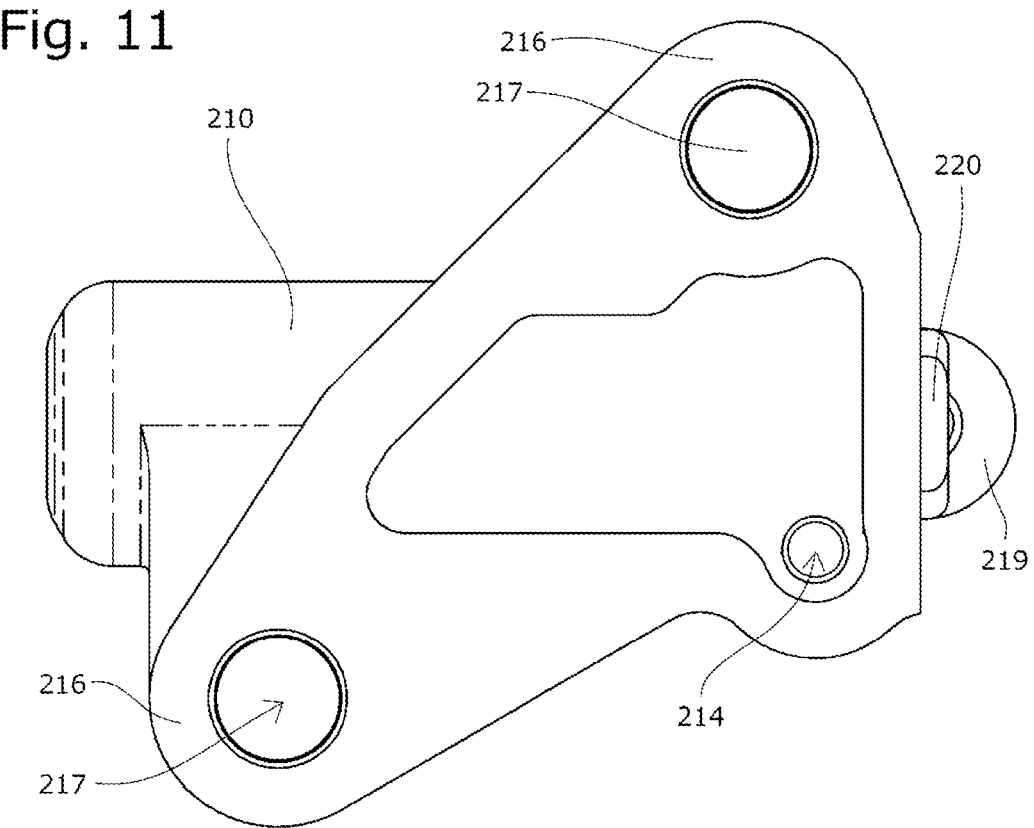
FIG. 11 is a bottom view of the chain tensioner according to the second embodiment of the present invention.
Figure 12:
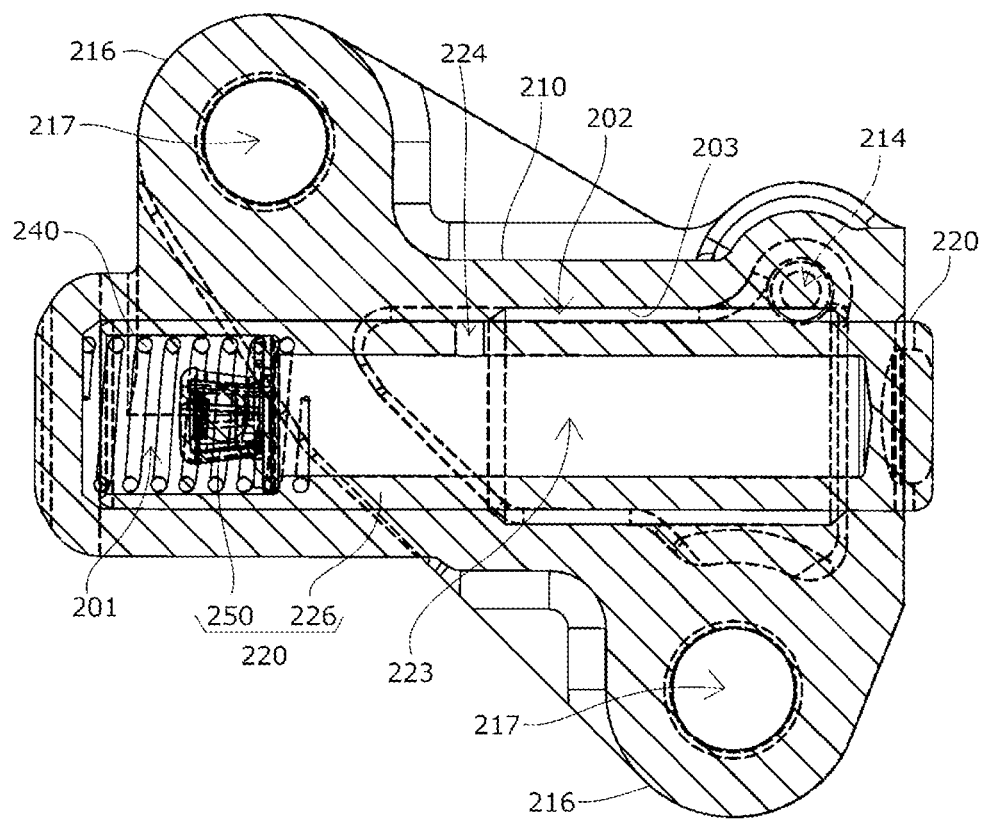
FIG. 12 is a cross-sectional view along II-II of FIG. 10.
Figure 13:
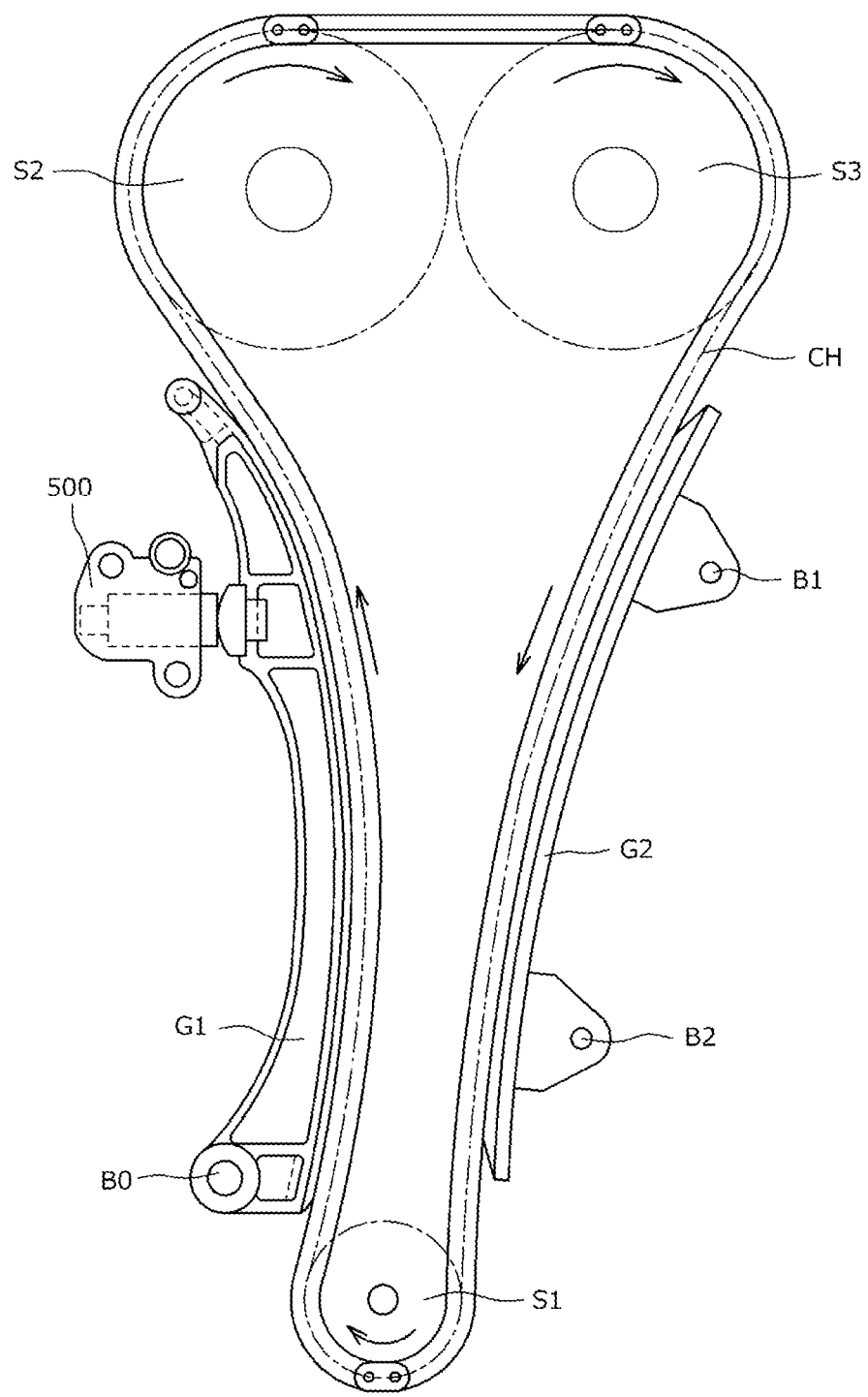
FIG. 13 is an explanatory diagram of the chain tensioner used in the chain guide mechanism of an engine.
Figure 14:
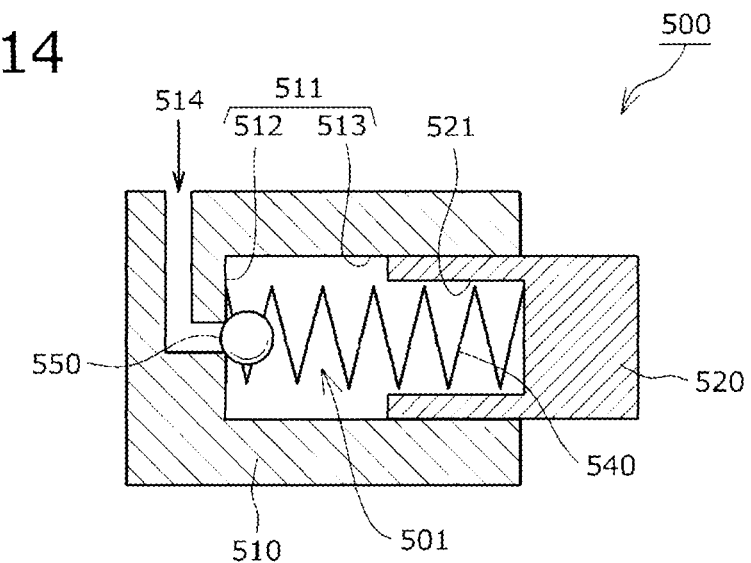
FIG. 14 is a schematic explanatory diagram of a conventional chain tensioner.

Optionally, an outer leak groove 127 shown in FIGS. 4A and 6A, which are views similar to FIGS. 4 and 6 having an outer leak groove, extending from the oil pressure chamber 101 to the supply space 102 may be formed in the outer circumference of the plunger body 126, so as to recover oil directly from the oil pressure chamber 101 to the oil reservoir chamber 123 via the outer leak groove, supply space 102, and plunger hole 124.

In this case, the outer leak groove 127 should preferably be located in the circumferentially same phase position as the plunger hole 124 so that they are continuous with each other, to recover oil back to the oil reservoir chamber 123 even more efficiently.

Embodiment 2

In the chain tensioner 200 according to a second embodiment of the present invention, as shown in FIG. 9 to FIG. 12, the supply space 202 is radially enlarged at the outward end thereof, with the oil supply hole 214 provided in this enlarged portion, so that the oil supply hole 214 is located higher than the plunger 220 in the radial direction thereof, as compared to the chain tensioner 100 according to the previously described first embodiment (same parts and elements are given reference numerals starting with number 2 as the hundred's digit and with the same last two digits as the reference numerals of corresponding parts and elements of the first embodiment).

In this embodiment, if the plunger 220 is designed to protrude upward relative to the horizontal plane, even more oil can be made to remain in the oil reservoir chamber 223, since the oil supply hole 214 is located at a highest possible position.

While specific examples of the chain tensioner according to the present invention have been described in the embodiments above, the chain tensioner according to the present invention is not limited to these examples, and the shapes, positions, sizes, and positional relationships with each other of various constituent parts may be changed in various manners.

For example, while the connection/adjustment groove 103 extends all around in the embodiments described above so that the supply space 102 is tubular, the connection/adjustment groove 103 may be formed only in part (in such a shape as, for example, the connection/adjustment groove 123 of Japanese Patent No. 4376278 mentioned above), so that the supply space 102 does not extend all around, as long as oil can be supplied during normal operation and recovered into the oil reservoir chamber 123 at start-up.

The outer leak groove and seat leak groove 154 in various embodiments may have any cross-sectional shape, depth, circumferential width, and the like, which may be selected suitably in accordance with the environment of its application, as long as it serves the purpose of the present invention and works as described above.

Other components commonly included in a chain tensioner, such as a ratchet mechanism, may of course be added to the configurations of the embodiments described above.

The chain tensioner of the present invention may not necessarily be applied to a chain guide mechanism that uses a guide shoe for slidably guiding a transmission chain such as an endless roller chain passing over respective sprockets of a crankshaft and a cam shaft in an engine room, but may also be adopted in applications where the chain is slidably guided by the distal end of the plunger.

The chain tensioner may not necessarily be applied to a chain transmission mechanism but also used for similar transmission mechanisms that use belts, ropes and the like, and can be applied in a variety of industrial fields where it is necessary to deliver enough oil at restart after a long time after the oil supply was stopped.

What is claimed is:

1. A chain tensioner comprising:
    a tensioner body having a cylindrical plunger bore with an open end;
    a cylindrical plunger slidably inserted in the plunger bore, the plunger including a plunger body and a check valve provided inside the plunger body; and
    biasing means accommodated inside an oil pressure chamber formed between the plunger bore and a rear end of the plunger such as to be able to expand and contract and to bias the plunger outward, wherein
    an oil reservoir chamber is formed on a side closer to a closed end of the cylindrical plunger inside the plunger body,
    a connection/adjustment groove forming an oil supply space is formed in an inner circumferential surface of the plunger bore,
    an oil supply hole for supplying oil to the supply space is formed in the plunger bore, and
    a plunger hole for supplying oil from the supply space to the oil reservoir chamber is formed in the plunger body.

2. The chain tensioner according to claim 1, wherein the oil supply hole is located at an end to which side the plunger protrudes from the supply space.

3. The chain tensioner according to claim 1, wherein an inner leak groove extending from the oil pressure chamber to the oil reservoir chamber is formed in the check valve.

4. The chain tensioner according to claim 1, wherein an outer leak groove extending from the oil pressure chamber to the supply space is formed in an outer circumferential surface of the plunger body on the oil pressure chamber side.

5. The chain tensioner according to claim 4, wherein the outer leak groove is located in a circumferentially same phase position as the plunger hole.

* * * * *